United States Patent [19]

Sorko-Ram

[11] Patent Number: 4,469,089
[45] Date of Patent: Sep. 4, 1984

[54] LIGHTWEIGHT, LOW COST RADIANT ENERGY COLLECTOR AND METHOD FOR MAKING SAME

[76] Inventor: Paul O. Sorko-Ram, 1111 N. Centerville, Sturgis, Mich. 49091

[21] Appl. No.: 345,263

[22] Filed: Feb. 2, 1982

[51] Int. Cl.³ .............................................. F24J 3/02
[52] U.S. Cl. ................................ 126/438; 350/293; 350/288
[58] Field of Search ............... 126/438, 439; 350/288, 350/292, 293, 310

[56] References Cited

U.S. PATENT DOCUMENTS

| | | | |
|---|---|---|---|
| 3,030,259 | 4/1962 | Long | 156/245 |
| 3,049,055 | 8/1962 | Tubbs | 88/105 |
| 3,536,800 | 10/1970 | Hubbard | 264/104 |
| 3,607,584 | 9/1971 | Becht | 161/4 |
| 3,716,869 | 2/1973 | Gould, Jr. et al. | 343/779 |
| 3,897,294 | 7/1975 | MacTurk | 156/245 |
| 3,916,418 | 10/1975 | Erdmann et al. | 343/912 |
| 3,993,528 | 11/1976 | Pauly | 156/245 |
| 4,077,393 | 3/1978 | Mattson | 126/271 |
| 4,088,120 | 5/1978 | Anderson | 126/438 X |
| 4,099,516 | 7/1978 | Caulier | 126/271 |
| 4,124,277 | 11/1978 | Stang | 350/310 |
| 4,235,224 | 11/1980 | Yarwood et al. | 126/438 |
| 4,238,265 | 12/1980 | Deminet | 156/221 |
| 4,239,344 | 12/1980 | Wildenrotter | 350/310 |
| 4,242,686 | 12/1980 | MacTurk | 343/912 |
| 4,249,513 | 2/1981 | Dostrovsky | 126/438 |
| 4,253,895 | 3/1981 | Chenault | 126/438 X |
| 4,296,736 | 10/1981 | Soot | 126/438 |
| 4,339,400 | 7/1982 | Sorko-Ram | 264/134 X |

Primary Examiner—Larry Jones
Attorney, Agent, or Firm—Krass & Young

[57] ABSTRACT

A dish-shaped, radiant energy collector comprises a thin, concave, thermoplastic cover having a reflective layer of metallization vapor deposited on the convex side thereof. A coating of foamed resin is applied to the metallization in order to render the collector self-supporting. Struts or a layer of honeycomb cardboard and/or fiberglass may be introduced into the sandwiched composite to provide further structural rigidity. The cover is produced by forming a flat sheet of acrylic plastic which is transparent to the wavelengths of interest.

10 Claims, 6 Drawing Figures

U.S. Patent  Sep. 4, 1984  4,469,089
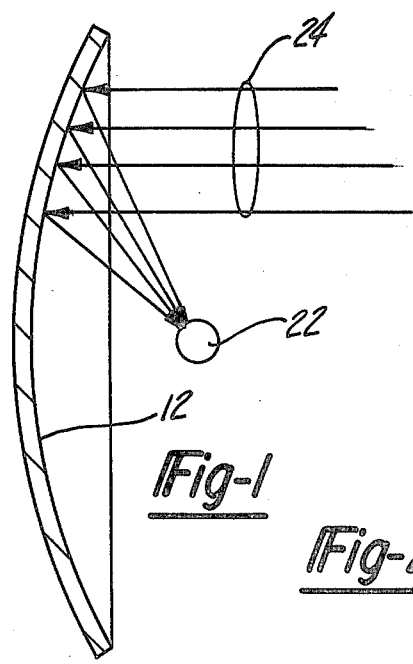
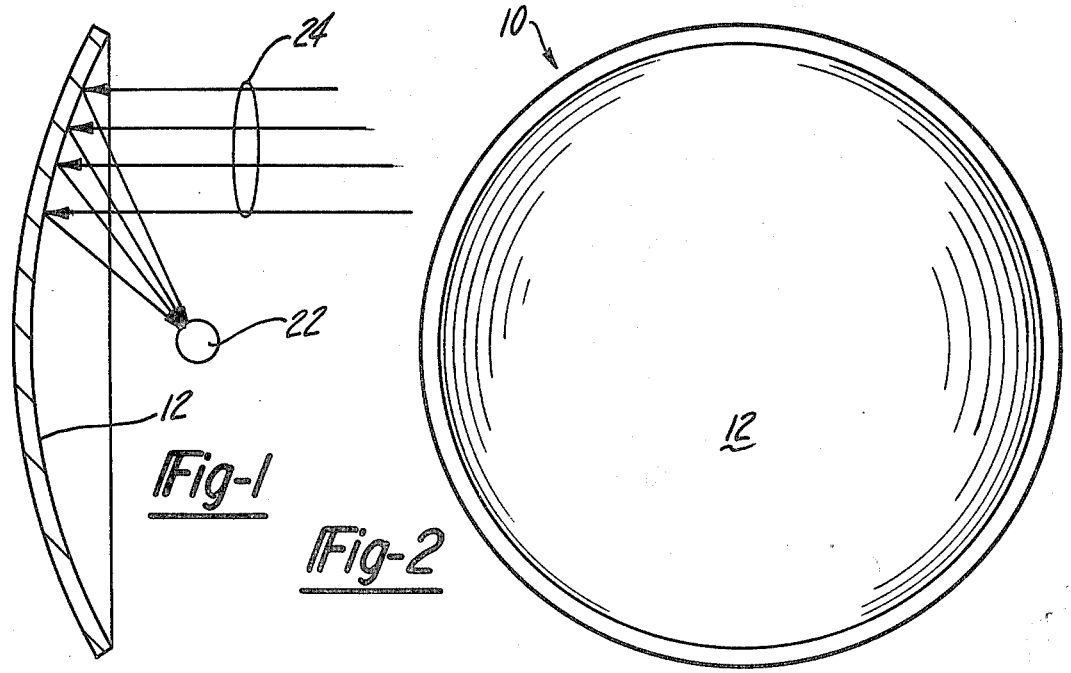
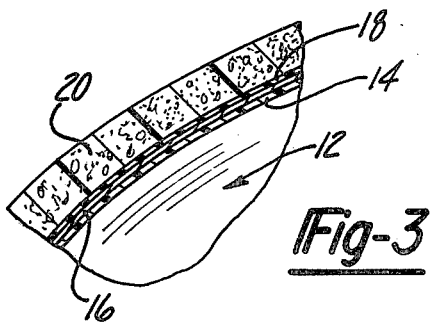
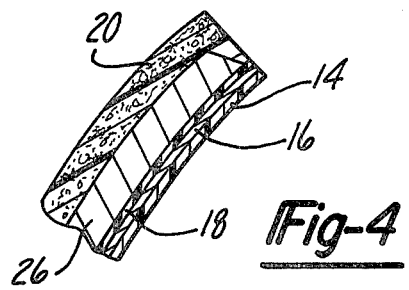
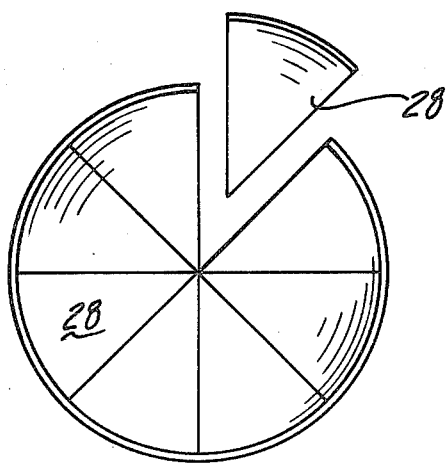
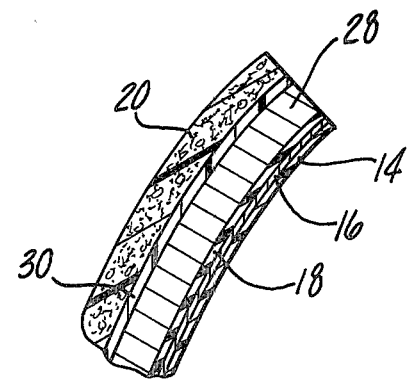

LIGHTWEIGHT, LOW COST RADIANT ENERGY COLLECTOR AND METHOD FOR MAKING SAME

TECHNICAL FIELD

The present invention generally relates to radiant energy collectors, and deals more particularly with a collector which reflects the energy to a focal point.

BACKGROUND ART

The demand for radiant energy collectors is increasing rapidly because of solar energy applications and advancements in radio communications technology. In the past, reflective type collectors have been constructed of materials which are relatively heavy and/or expensive from a manufacturing standpoint.

For example, others in the past have resorted to a collector construction which employs a sandwiched composite including an outer concave sheet of glass. The use of a glass cover is not only expensive but renders the collector vulnerable to breakage or damage, particularly when exposed to an out-of-doors environment. Glass covers are also subject to breakage during the manufacturing operation and result in a collector which is relatively heavy.

In view of the foregoing, it is clear that there is a need in the art for a low cost, lightweight radiant energy collector which obviates each of the disadvantages discussed above.

Accordingly, it is the primary object of the present invention to provide a device for collecting radiant energy which may be used in either solar or radio receiver applications which is exceptionally lightweight and not subject to breakage or damage, even when subjected to harsh environments.

Another object of the invention is to provide a collector of the type described above which includes an inexpensive thermoplastic outer cover which is transparent to the wavelengths to be collected.

A still further object of the invention is to provide a collector of the type described immediately above which includes a layer of reflective metallization thereon which is substantially free of blushing and is therefore highly reflective.

These, and further objects of the invention will be made clear or will become apparent during the course of a detailed description of the invention set out below.

DISCLOSURE OF THE INVENTION

A dish-shaped, radiant energy collector comprises a composite sandwich of materials including an outer cover of thermoplastic material such as acrylic which is transparent to the wavelengths to be collected. The thermoplastic cover is fabricated by forming a flat sheet of thermoplastic material into a concave configuration and then vapor depositing a layer of reflective metal, such as aluminum on the convex side thereof. Alternatively, metallization may be performed prior to the forming step if the sheet is subjected to an annealing process. A layer of foamed resin or polyester reinforced with fiberglass is then applied to the backside of the metalization in order to render the collector self-supporting. Struts or a layer of honeycomb cardboard and/or fiberglass may be introduced into the composite to provide the collector with further structural rigidity. Large collectors may be constructed in pie-shaped segments of the composite and assembled in the field.

BRIEF DESCRIPTION OF THE DRAWINGS

In the drawings, which are to be read in conjunction with the specification and wherein like reference numerals are employed to designate identical components in the various views;

FIG. 1 is a cross-sectional view of a radiant energy collector which forms the preferred embodiment of the present invention;

FIG. 2 is a front view of the collector shown in FIG. 1;

FIG. 3 is a fragmentary, cross-sectional view of the collector shown in FIGS. 1 and 2, depicting the various layers of the composite;

FIG. 4 is a fragmentary, cross-sectional view of an alternate form of the collector;

FIG. 5 is a front view of another alternate form of the invention, one of the collector segments being partially removed; and, FIG. 6 is a fragmentary, cross-sectional view of still another alternate form of the invention.

BEST MODE FOR CARRYING OUT THE INVENTION

Referring first to FIGS. 1-3, the present invention is broadly concerned with a device 10 for collecting radiant energy of various wavelengths which may be employed, for example, as a radio antenna dish or solar collector.

The device 10 is substantially hemispherical as shown in the drawings, however it is to be understood that the collector of the present invention may also be parabolic in geometry, if desired. Radiant energy waves 24 incident upon the concave surface 12 of the device 10 are reflected to a focal point 22 which may consist of thermally absorbent media for solar applications or a radio antenna element.

The concave surface 12 of the device 10 is defined by a thermoplastic outer cover 14 whose physical properties are selected so as to be transparent to the wavelengths of interest. In the case of a solar energy application, outer cover 14 would be substantially clear so as to pass wavelengths in the visible and infrared range therethrough. The thermoplastic from which the outer cover 14 is formed preferably comprises acrylic but, alternatively, may consist of acetate, styrene or the like; acrylic as used herein is defined as any thermoplastic material having a substantially methylmethacrylate base. Typically, the outer cover 14 is approximately 0.030 to 0.500 inches thick. However, the relationship of its thickness to its diameter (width) is such that outer cover 12 is not self-supporting. The interior (convex) face of cover 14 possess a coating 16 of reflective metallization thereon sufficiently thick to provide a substantially reflective surface. The reflective coating 16 may comprise of aluminum, for example, applied by conventional vapor deposition techniques.

The outer cover 14 having the reflective coating 16 thereon is preferably produced by forming a flat sheet of thermoplastic material into a concave shape and then metallizing the convex side thereof, as by vapor deposition. Alternatively, however, the metallization may be applied prior to forming the sheet if the latter is first annealed. The annealing process is performed by placing the thermoplastic sheet in an oven at a temperature of approximately 250-400° F. for a period of five to ten minutes, depending upon the thickness of the sheet. The preheated sheet is removed from the oven and is allowed to cool to room temperature before further processing. The effect of the annealing process is to preshrink the sheet so as to achieve dimensional stability during subsequent processing steps. The annealed sheet is then coated with a layer of vacuumed deposited metal, as discussed above. A coating 18 of abrasion resistant material, such as paint, is applied, as by spraying, over the reflective coating 16 so as to protect the latter during further processing steps. The metallized cover is then heated to a temperature sufficient to form the sheet into the desired shape. The forming step may be carried out by vacuum forming, drape forming or blow forming in the conventional manner. In any event, the annealing step described above has been found effective in avoiding blushing of the metallization; a blushed finish is one in which the continuous metallic reflective coating is converted to a multiplicity of microfractures which refract, rather than reflect light impinging on the surface of the coating.

Having formed the metallized, outer cover 14 into the desired shape, a layer 20 of foamed resin is applied over coating 18 so as to provide the device with dimensional stability and structural rigidity. The foam resin 20 may consist of urethane, polyester, styrene or the like. The foam layer 20 may typically be from one-eighth to six inches in thickness and may be applied either by spraying the resin onto the substrate or placing the substrate into a conventional two piece mold and adding the foam resin into the mold over the substrate.

Referring now to FIG. 4, if desired, a plurality of radially extending, circumferentially spaced ribs or struts 26 comprising metal, plastic or other rigid material, may be introduced prior to or during the application of the foam layer 20 in order to provide the device with additional structural rigidity.

As shown in FIG. 5, the collector may be formed from a plurality of pie-shaped segments 28, each of the segments 28 being formed from the composite sandwich structure shown in either FIG. 3 or 4 with the curvature of the outer cover 14 of each segment being identical so as to form a substantially continuous concave reflecting surface. The segmented construction described above is particularly useful for large collectors since the individual segments 28 may be assembled in the field.

Still another form of the sandwich composite is shown in FIG. 6. Outer cover 14,, reflective coating 16 and protective layer 18 are substantially identical to those previously described. Additionally, a layer of open cell, honeycomb cardboard 28 is applied over the substrate followed by a layer 30 of polyester resin reinforced with fiberglass. Finally, a layer of foamed resin 20 is applied over the polyester layer 30.

The present invention contemplates still another form of reinforcement structure for supporting the metallized outer cover 14 which consists of chopped pieces of fiberglass mixed with foamed resin of the type mentioned above. The foam resin and chopped fiberglass may be mixed in the mixing head of a conventional blowing machine which includes an orifice through which the mixture is sprayed under pressure onto the convex substrate. This foam resin/ chopped fiberglass mixture may be applied directly to the metallized outer cover 14 as in FIG. 3, or onto either the layer 30 or cardboard 28, depicted in FIG. 6.

A suitable reinforcement structure may also be constructed by first applying the foam resin 20 and then spraying chopped pieces of fiberglass on top of the foam resin 20 to form the outer layer of the reinforcement.

In each of the embodiments described above, it is desirable to coat the outer layer of the reinforcement structure (foam resin or fiberglass) with a material such as latex or the like which forms a barrier to ultraviolet light, thus to prevent decomposition of such outer layer.

Each of the composite constructions described above is extremely lightweight owing to the materials from which it is constructed and is also relatively inexpensive to manufacture. Moreover, the collector of the present invention is extremely rugged and is not subject to damage or breakage as a result of environmental factors. Thus, from the foregoing, it is apparent that the collector and method for producing same described above not only provide for the reliable accomplishment of the objects of the invention but do so in a particular inexpensive and effective manner. It is recognized, of course, that those skilled in the art may make various modifications or additions to the preferred embodiment choosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

I claim:
1. A concave, radiant energy collector, consisting of:
   a concave sheet of flexible thermoplastic material substantially transparent ot said radiant energy;
   a coating of reflective material vapor deposited on the convex side of said sheet; and
   a structurally supporting layer of foamed resin on said reflective layer, said layer of foamed resin possessing sufficient rigidity to support said concave sheet and said reflective coating.
2. The collector of claim 1, wherein said thermoplastic material is acrylic.
3. The collector of claim 1, wherein said sheet has a thickness less than that required for a dimensionally stable, self-supporting concave thermoplastic sheet.
4. The collector of claim 1, including means substantially imbedded in said foamed resin layer for stiffening said collector.
5. The collector of claim 4, wherein said stiffening means includes randomly oriented, descrete pieces of fiberglass.
6. The collector of claim 4, wherein said stiffening means includes a plurality of circumferentially spaced, radially extending, rigid ribs.
7. The collector of claim 1, including a layer of reinforced polyester and a layer of open cell honeycomb material on said reflective coating.
8. The collector of claim 1, wherein said collector is defined by a plurality of generally pie shaped segments each consisting of a sandwiched construction of said concave sheet, said reflective coating and said foamed resin.
9. The collector of claim 1, including a layer of paint between said reflective coating and said foamed resin.
10. The collector of claim 1, including a layer of randomly oriented, descrete pieces of fiberglass bonded together substantially over said foamed resin.

* * * * *